(12) United States Patent
Laczko et al.

(10) Patent No.: US 6,256,348 B1
(45) Date of Patent: Jul. 3, 2001

(54) REDUCED MEMORY MPEG VIDEO DECODER CIRCUITS AND METHODS

(75) Inventors: Frank L. Laczko, Allen; Yetung Paul Chiang, Richardson, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/706,161

(22) Filed: Aug. 30, 1996

(51) Int. Cl.$^7$ ................ H04N 7/32; H04N 7/18
(52) U.S. Cl. ................ 375/240.15; 375/240.16; 375/240.17
(58) Field of Search .................. 348/439, 402, 348/409, 415, 392, 404, 408, 419, 567, 390, 568; 358/426, 432, 433, 479; 341/67, 106; 375/240.12–240.17

(56) References Cited

U.S. PATENT DOCUMENTS

| | | | |
|---|---|---|---|
| 5,502,494 | * 3/1996 | Auld | 348/426 |
| 5,581,302 | * 12/1996 | Ran et al. | 348/416 |
| 5,691,768 | * 11/1997 | Civanlar et al. | 348/392 |
| 5,777,677 | * 7/1998 | Linzer et al. | 348/397 |
| 5,818,533 | * 10/1998 | Auld et al. | 348/412 |
| 5,825,424 | * 11/1997 | Canfield et al. | 348/416 |
| 5,838,597 | * 12/1996 | Pau et al. | 348/402 |
| 5,923,375 | * 7/1999 | Pau | 348/390 |

* cited by examiner

*Primary Examiner*—Andy Rao
(74) *Attorney, Agent, or Firm*—Robert D. Marshall, Jr.; W. James Brady, III; Frederick J. Telecky, Jr.

(57) ABSTRACT

A video decoder having an input buffer for receiving an encoded and compressed data stream, parsing circuitry for removing header information from said data stream, circuitry for decoding said data stream, circuitry for decompressing said data stream, circuitry for selecting predetermined portions of preselected frames, memory for storing said decompressed data stream and selected portions of said preselected frames, and circuitry for reconstructing selected portions of said preselected frames is provided.

14 Claims, 3 Drawing Sheets

REDUCED MEMORY MPEG VIDEO DECODER CIRCUITS AND METHODS

FIELD OF THE INVENTION

This invention generally relates to improved digital video signal processing, and more particularly, to reduced memory video decoder circuits and methods.

BACKGROUND OF THE INVENTION

International standardization committees have been working on the specification of the coding methods and transmission formats for several compression algorithms to facilitate world wide interchange of digitally encoded audiovisual data. The Joint Photographic experts Group (JPEG) of the International Standards Organization (ISO) specified an algorithm for compression of still images. The ITU (formerly CCITT) proposed the H.261 standard for video telephony and video conference. The Motion Pictures Experts Group (MPEG) of ISO specified a first standard, MPEG-1, which is used for interactive video and provides a picture quality comparable to VCR quality. MPEG has also specified a second standard, MPEG-2, which provides audiovisual quality of both broadcast TV and HDTV. Because of the wide field of applications MPEG-2 is a family of standards with different profiles and levels.

The JPEG coding scheme could be in principal also used for coding of images sequences, sometimes described as motion JPEG. However, this intraframe coding is not very efficient because the redundancy between successive frames is not exploited. The redundancy between succeeding frames can be reduced by predictive coding. The simplest predictive coding is differential interframe coding where the difference between a current pixel of the present frame and the corresponding pixel of the previous frame is quantized, coded and transmitted. To perform such interframe prediction a frame memory for storing one or more frames is required to allow for this pixel by pixel comparison. Higher efficiency than the simple differential interframe coding can be achieved by a combination of discrete cosine transform (DCT) and interframe prediction. For so-called hybrid coding the interframe difference, which is similar to JPEG, is obtained, DCT coded and then transmitted. In order to have the same prediction at both the receiver and transmitter the decoder is incorporated into the coder. This results in a special feedback structure at the transmitter which avoids coder-decoder divergence.

Variable word length coding results in a variable bit rate which depends on image content, sequence change, etc. Transmission of the coded information over a constant rate channel requires a FIFO buffer at the output to smooth the data rate. The average video rate has to be adjusted to the constant channel rate. This is performed by controlling the quantizer according to the buffer content. If the buffer is nearly full, the quantization is made more sever and thus the coded bitrate is reduced. Conversely, if the buffer is nearly empty, the quantization is relaxed.

In general, the MPEG coding use a special predictive coding strategy. The coding starts with a frame which is not differentially coded; it is called an Intra frame (I). Then prediction is performed for coding one frame out of every M frames. This allows computation of a series of predicted frames (P), while "skipping" M-1 frames between coded frames. Finally, the "skipped" frames are coded in either a forward prediction mode, backward prediction mode, or bidirectional prediction mode. These frames are called bidirectionally interpolated (B) frames. The most efficient prediction mode, in terms of bitrate, is determined by the encoder and its selected mode is associated with the coded data. Thus the decoder can perform the necessary operations in order to reconstruct the image sequence. A main difference between MPEG-1 and MPEG-2 is that MPEG-1 has been optimized for noninterlaced (progressive) format while MPEG-2 is a generic standard for both interlaced and progressive formats. Thus, MPEG-2 includes more sophisticated prediction schemes.

In more detail, motion pictures are provided at thirty frames per second to create the illusion of continuous motion. Since each picture is made up of thousands of pixels, the amount of storage necessary for storing even a short motion sequence is enormous. As higher and higher definitions are desired, the number of pixels in each picture grows also. This means that the frame memory used to store each picture for interframe prediction also grows; current MPEG systems use about 16 megabits (MB) of reference memory for this function. Fortunately, lossy compression techniques have been developed to achieve very high data compression without loss of perceived picture quality by taking advantage of special properties of the human visual system. (A lossy compression technique involves discarding information not essential to achieve the target picture quality to the human visual system). An MPEG decoder is then required to reconstruct in real time or nearly real time every pixel of the stored motion sequence; current MPEG decoders use at least about 16 MB of frame memory for reconstruction of frames using the encoded interframe prediction data.

The MPEG standard specifies both the coded digital representation of video signal for the storage media, and the method for decoding to achieve compatibility between compression and decompression equipment. The standard supports normal speed playback, as well as other play modes of color motion pictures, and reproduction of still pictures. The standard covers the common 525- and 625-line television, personal computer and workstation display formats. The MPEG-1 standard is intended for equipment supporting continuous transfer rate of up to 1.5 Mbits per second, such as compact disks, digital audio tapes, or magnetic hard disks. The MPEG-2 standard supports bit rates from 4 Mbits/sec (Mbits) to 15 Mbits an distargeted for equipment that complies with the International Radio Consultative Committee (CCIR) recommendation 601 (CCIR-601). The MPEG standard is intended to support picture frames at a rate between 24 Hz and 30 Hz. ISO-11171 entitled "Coding for Moving Pictures and Associated Audio for digital storage medium at 1.5 Mbit/s," provides the details of the MPEG-1 standard. ISO-13838 entitled "Generic Coding of Moving Pictures and Associated Audio" provides the details of the MPEG-2 standard.

Under the MPEG standard, the picture frame is divided into a series of "Macroblock slices" (MBS), each MBS containing a number of picture areas (called "macroblocks") each covering an area of 16×16 pixels. Each of these picture areas is represented by one or more 8×8 matrices which elements are the spatial luminance and chrominance values. In one representation (4:2:2) of the macroblock, a luminance value (Y type) is provided for every pixel in the 16×16 pixels picture area (in four 8×8 "Y" matrices), and chrominance values of the U and V (i.e., blue and red chrominance) types, each covering the same 16×16 picture area, are respectively provided in two 8×8 "U" and two 8×8 "V" matrices. That is, each 8×8 U or V matrix covers an area of 8×16 pixels. In another representation (4:2:0), a luminance value is provided for every pixel in the 16×16 pixels picture area, and one 8×8 matrix for each of the U and V types is provided to represent the chrominance values of the 16×16 pixels picture area. A group of four continuous pixels in a 2×2 configuration is called a "quad pixel"; hence, the macroblock can also be thought of as comprising 64 quad pixels in an 8×8 configuration.

The MPEG standard adopts a model of compression and decompression shown in FIG. 1. As shown in FIG. 1, interframe redundancy (represented by block 101) is first removed from the color motion picture frames. To achieve interframe redundancy removal, each frame is designated either "intra" "predicted" or "interpolated" for coding purpose. Intra frames are least frequently provided, the predicted frames are provided more frequently than the intra frames, and all the remaining frames are interpolated frames. The values of every pixel in an intra frame ("I-picture") is independently provided. In a prediction frame ("P-picture"), only the incremental changes in pixel values from the last I-picture or P-picture are coded. In an interpolation frame ("B-picture"), the pixel values are coded with respect to both an earlier frame and a later frame. Again, large (16 MB) frame or reference memories are required to store frames of video to allow for this type of coding.

The MPEG standard does not require frames to be stored in strict time sequence, so that the intraframe from which a predicted frame is coded can be provided in the picture sequence either earlier or later in time from the predicted frame. By coding frames incrementally, using predicted and interpolated frames, much interframe redundancy can be eliminated which results in tremendous savings in storage requirements. Further, motion of an entire macroblock can be coded by a motion vector, rather than at the pixel level, thereby providing further data compression.

The next steps in compression under the MPEG standard remove intraframe redundancy. In the first step, represented by block 102 of FIG. 1, a 2-dimensional discrete cosine transform (DCT) is performed on each of the 8×8 values matrices to map the spatial luminance or chrominance values into the frequency domain.

Next, represented by block 103 of FIG. 1, a process called "quantization" weights each element of the 8×8 matrix in accordance with its chrominance or luminance type and its frequency. In an I-picture, the quantization weights are intended to reduce to one many high frequency components to which the human eye is not sensitive. In P- and B-pictures, which contain mostly higher frequency components, the weights are not related to visual perception. Having created many zero elements in the 8×8 matrix, each matrix can now be represented without information loss as an ordered list of a "DC" value, and alternating pairs of a non-zero "AC" value and a length of zero elements following the non-zero value. The list is ordered such that the elements of the matrix are presented as if the matrix is read in a zigzag manner (i.e., the elements of a matrix A are read in the order A00, A01, A10, A20, A11, A02, etc.). The representation is space efficient because zero elements are not represented individually.

Finally, an entropy encoding scheme, represented by block 104 in FIG. 1, is used to further compress the representations of the DC block coefficients and the AC value-run length pairs using variable length codes. Under the entropy encoding scheme, the more frequently occurring symbols are represented by shorter codes. Further efficiency in storage is thereby achieved.

Decompression under MPEG is shown by blocks 105–108 in FIG. 1. In decompression, the processes of entropy encoding, quantization and DCT are reversed, as shown respectively in blocks 105–107. The final step, called "absolute pixel generation" (block 108), provides the actual pixels for reproduction, in accordance to the play mode (forward, reverse, slow motion e.g.), and the physical dimensions and attributes of the display used. Again, large (16 MB) frame or reference memories are required to store frames of video to allow for this type of reproduction.

Since the steps involved in compression (coding) and decompression (decoding), such as illustrated for the MPEG standard discussed above, are very computationally intensive and require large amounts of memory, for such a compression scheme to be practical and widely accepted, the decompression processor must be designed to provide decompression in real time, and allow economical implementation using today's computer or integrated circuit technology.

Improvements in circuits, integrated circuit devices, computer systems of all types, and methods to address all the just-mentioned challenges, among others, are desirable, as described herein.

SUMMARY OF THE INVENTION

Generally, and in one form of the present invention, an MPEG 2 video decoder having an input buffer for receiving an encoded and compressed data stream, parsing circuitry for removing video header information from said data stream, circuitry for decoding said data stream, circuitry for decompressing said data stream, circuitry for selecting predetermined portions of preselected frames, memory for storing said decompressed data stream and selected portions of said preselected frames, and circuitry for reconstructing selected portions of said preselected frames is provided.

The present invention also provides a method for reducing the amount of memory for storing video pictures, by determining if the amount of video memory needs to be reduced, and selectively decimating preselected frames of said video picture to reduce their frame size thereby reducing the amount of memory required to store said preselected frames if the amount of video memory needs to be reduced.

In another form of the present invention, a method for video decoding, consisting of, receiving an encoded and compressed data stream, parsing header information from said encoded and compressed data stream, decoding and decompressing the parsed data stream, selectively decimating selected frames to reduce frame size, and storing the reduced frame size is provided.

The present invention provides an integrated circuit having an input buffer for receiving an encoded and compressed data stream, parsing circuitry for removing video header information from said data stream, circuitry for decoding said data stream, circuitry for decompressing said data stream, circuitry for selecting predetermined portions of preselected frames, memory for storing said decompressed data stream and selected portions of said preselected frames, and circuitry for reconstructing selected portions of said preselected frames.

Other improved IC devices, systems and methods are also claimed.

BRIEF DESCRIPTION OF THE DRAWINGS

The invention may be understood by reference to the detailed description which follows, read in conjunction with the accompanying drawings in which.

DETAILED DESCRIPTION

Figure 1:
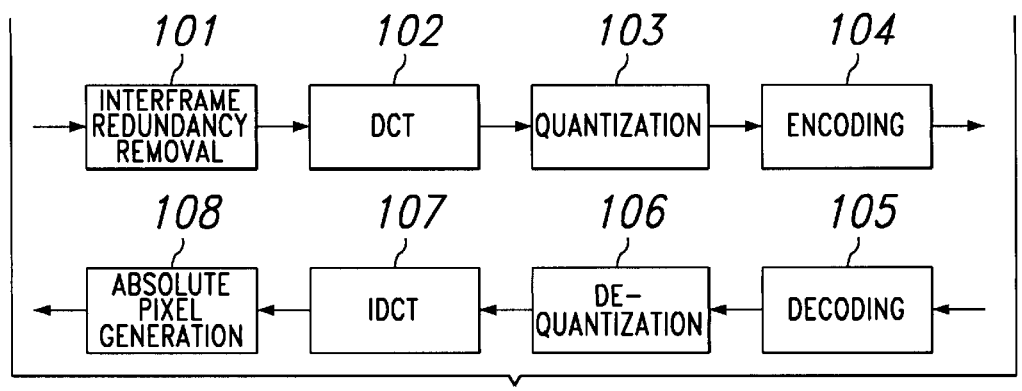
FIG. 1 is a model of the compression and decompression processes under the MPEG standard.
Figure 2:
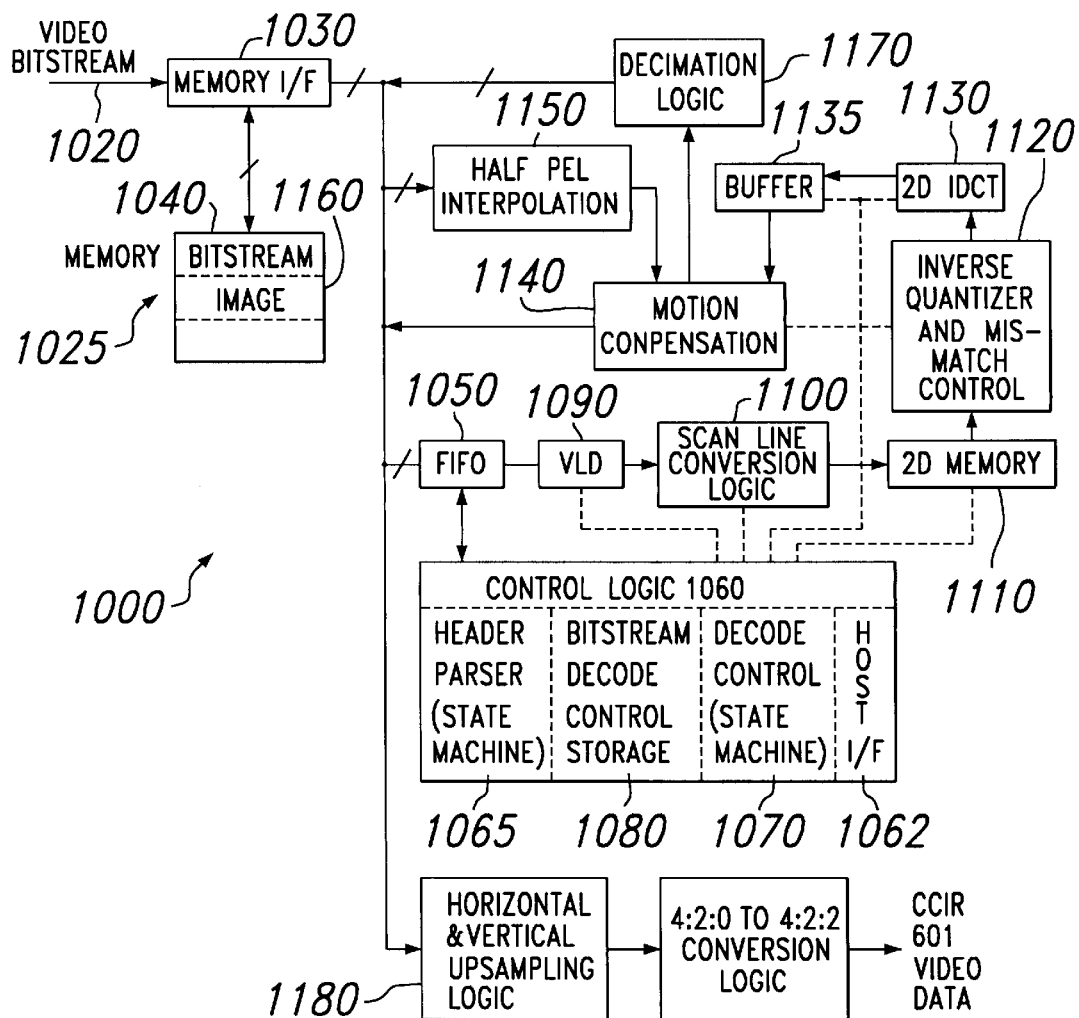
FIG. 2 is a simplified electrical block diagram of an embodiment of an improved MPEG video decoder according to the present invention.

Referring initially to FIG. 2, there may be seen a block diagram of an improved video decoder architecture 1000 of the present invention. In FIG. 2, incoming coded video 1020 is received in a memory interface 1030 (input buffer) which outputs the video bitstream to a block of memory 1025, which includes a section partitioned and dedicated as a bitstream memory 1040, where it is temporarily stored. Memory 1025 is preferably SDRAM, but may be any type of memory, including but not limited to DRAM, EDO, Flash, or other types of memory. Memory 1025 is used for storing an encoded and compressed data stream, and as noted later herein, is also used to store decoded and decompressed data streams and selected portions of preselected frames in a partitioned image section 1160.

The stored bitstream is output through the memory interface 1030 to a FIFO 1050. FIFO 1050 in turn passes the bitstream to a control logic block 1060, which includes header parser logic that is preferably implemented as a header parser state machine 1065, which removes the header information from the bitstream. The header parser state machine is preferably implemented as sequential logic configured to realize the requisite functions. The video bitstream (less the header information) is then passed back to FIFO 1050. That is, FIFO 1050 is an input buffer for receiving an encoded and compressed data stream.

The header information is utilized by the state machine 1065 to develop bitstream decode control information that is passed to a bitstream decode control storage 1080, that is preferably included as part of control logic 1060. The control logic 1060 uses this bitstream decode control information to control further processing of the video bitstream, as described later herein, preferably though decode control logic 1070, which is preferably implemented as a decode control state machine 1070. The decode control state machine is preferably implemented as sequential logic configured to realize the requisite functions. That is, control logic 1060 provides parsing circuitry for removing video header information from said data stream.

Continuing to refer to FIG. 2, the video bitstream is passed from FIFO 1050 to a variable length decoder (VLD) block 1090, which preferably performs Huffman decoding. That is, variable length decoder (VLD) block 1090 is circuitry for decoding said data stream.

The decoded video bitstream is then passed to a scan line conversion logic circuit 1100, which coverts the serial data stream into an 8 by 8 array of pixels. The scan line conversion logic passes the 8 by 8 array of pixels of the video bitstream to a 2D memory 1110. 2D memory 1110 preferably stores the 8 by 8 array of pixels and is a small portion of local memory; memory 1110 may be implemented as any type of convenient temporary storage circuit, such as for example, but not limited to, an appropriately sized buffer circuit.

An inverse quantization and mismatch control circuit 1120 retrieves the array of the video bitstream from the 2D memory 1110 and performs inverse quantization or dequantization on the bitstream; that is, the coefficients that resulted from the prior DCT are reconstructed and placed in a 2D array in preparation for the IDCT block 1130. In addition, the mismatch logic portion compensates the pixels for known degradation of pixel quality resulting from the use of the fixed length code and thus introducing rounding errors in the pixels.

The bitstream is then passed on to a 2D inverse discrete cosine transform circuit (IDCT) 1130 where an inverse discrete cosine transform is performed on the bitstream resulting in a restored 8 by 8 array of pixels of the video bitstream for intra frames or differences for predicted frames. That is, the 2D inverse discrete cosine transform circuit (IDCT) 1130 maps the bitstream from frequency space into the display space using these 8 by 8 arrays.

The restored video array is passed to a buffer 1135 which accumulates four 8 by 8 arrays to form a 16 by 16 macroblock that a motion compensation circuit 1140 employs to reconstruct a full frame. The motion compensation circuit 1140 reconstructs the full frame for P frames and B frames from these macroblocks using motion vectors and past and/or future frames stored in image memory 1160. The motion compensation circuit 1140 also uses a half-pixel interpolation circuit 1150 to provide needed frame pixel data for reconstruction of a frame or portions of a frame. The fully restored and interpolated video bitstream is stored in the image memory 1160 via the memory interface 1030, if it is part of an I frame or P frame. If it is part of a B frame, control logic 1060 passes the bitstream to decimation logic 1170 where it is selectively decimated and then stored in image memory 1160, via memory interface 1030. In this manner, the decoder 1000 of the present invention reduces the amount of memory 1025 required to store the B frames. That is, decimation logic 1170 is circuitry for selecting predetermined portions of preselected frames.

More particularly, decimation logic 1170 takes a 2D block of image data as an input and reduces the size in the horizontal and/or vertical direction to reduce the amount of storage required for a B frame. Although the decoder 1000 of the present invention is described herein in reference to reduced memory storage for a B frame, clearly this technique may be applied to any type of frame, and use with one or more of the other types of frames is considered within the scope of the present invention. For a vertical reduction, decimation logic 1170 may eliminate every other line of image data. This may be accomplished by using a line buffer that under appropriate control of certain control signals discards every other line. For a horizontal reduction, decimation logic 1170 may eliminate every other pixel in a line of image data. This may be accomplished by using a line buffer that under appropriate control of certain control signals discards every other pixel.

For playback of the I or P frame, control logic 1060, via appropriate control signals (not depicted), ensures the frame stored in image memory 1160 is passed to the conversion circuit or logic 1190 which outputs a CCIR-601 video data stream. More particularly, the output is in a byte serial CCIR-601 format; the decoder of the present invention supports both interlaced and non-interlaced applications. A synch signal, which indicates the beginning of a frame, can be generated by the decoder 1000 as an output signal, or may be provided by external display equipment as an input signal to decoder 1000.

For playback of the B frame the partial frame stored in image memory 1160 is passed to the horizontal and vertical upsampling circuit 1180 where the decimation is recovered and then to the conversion circuit 1190 which outputs a CCIR-601 video data stream. That is, horizontal and vertical upsampling circuit 1180 is circuitry for reconstructing selected portions of said preselected frames.

More particularly, the horizontal and vertical upsampling circuit 1180 takes a 2D block of image data as an input and restores the size in the horizontal and/or vertical direction back to the original frame size for a B frame. Although the decoder 1000 of the present invention is described herein in reference to reduced memory storage for a B frame, clearly this technique may be applied to any type of frame, and use with one or more of the other types of frames is considered within the scope of the present invention. For a vertical reduction, horizontal and vertical upsampling circuit 1180 may add every other line of image data. For a horizontal reduction, the horizontal and vertical upsampling circuit 1180 may add every other pixel in a line of image data. The horizontal and vertical upsampling logic 1180 restores the reduced image to its full size. Depending on how the image was decimated this block performs the inverse upsampling operation with one or both of the following filters: a vertical 1 to 2 upsampling filter, and a horizontal 1 to 2 upsampling filter.

Alternatively, the order of the horizontal and vertical upsampling logic 1180 and the conversion logic 1190 may reversed and still be within the scope of the present invention.

Control logic block 1060 controls the overall operation of the components of decoder 1000 to operate in the manner described above. Control logic block 1060 receives as inputs clock signals, interrupt signals, reset signals, test signals, and other control input signals, such as control signals from a host processor (not depicted), via the host interface (I/F) 1062 portion of control logic block 1060.

Thus, it may be seen that the present invention provides a decoder having an input buffer for receiving an encoded and compressed data stream, parsing circuitry for removing header information from said data stream, circuitry for decoding said data stream, circuitry for decompressing said data stream, circuitry for selecting predetermined portions of preselected frames, memory for storing said decompressed data stream and selected portions of said preselected frames, and circuitry for reconstructing selected portions of said preselected frames.

It may also be seen that the present invention provides circuitry that allows for reducing the amount of memory for preselected frames. One representative example of when it may be appropriate to reduce the amount of memory for frame storage is when an on screen display (OSD) is present. For this case, the control logic 1060 determines that OSD data is present and then decimates preselected frames to free up memory for storing the OSD data; the amount of decimation may be appropriately selected in advance by a user providing appropriate signals to the control logic 1060. That is, the decimation may be only for the horizontal or vertical direction which reduces memory requirements by half, or it may include both horizontal and vertical decimation which reduces memory requirements to one fourth that previously needed.

Thus, it may be seen that the present invention provides a method for reducing the amount of memory for storing video pictures, by determining if the amount of video memory needs to be reduced, and selectively decimating preselected frames of said video picture to reduce their frame size thereby reducing the amount of memory required to store said preselected frames if the amount of video memory needs to be reduced.

Figure 3:
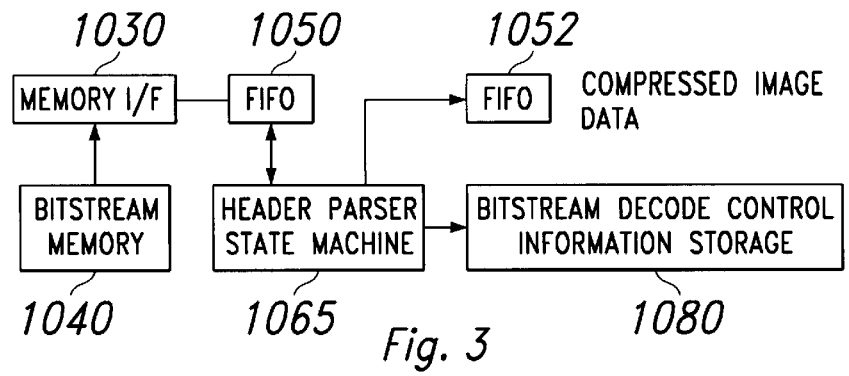
FIG. 3 is a partial block diagram indicating the portion of FIG. 2 needed for a step of a method of the present invention.

Referring now to FIG. 3, there may seen a partial block diagram indicating the portion of FIG. 2 needed for an initial step of a method of the present invention which consists of parsing header information from an encoded and compressed data stream. FIG. 3 includes an additional FIFO 1052, which may different from or the same as FIFO 1050, that receives the parsed data stream. The first step is receiving the encoded and compressed data stream, after which it is parsed. The header information is appropriately stored for use by control logic that determines how the data stream is decoded and decompressed.

Figure 4:
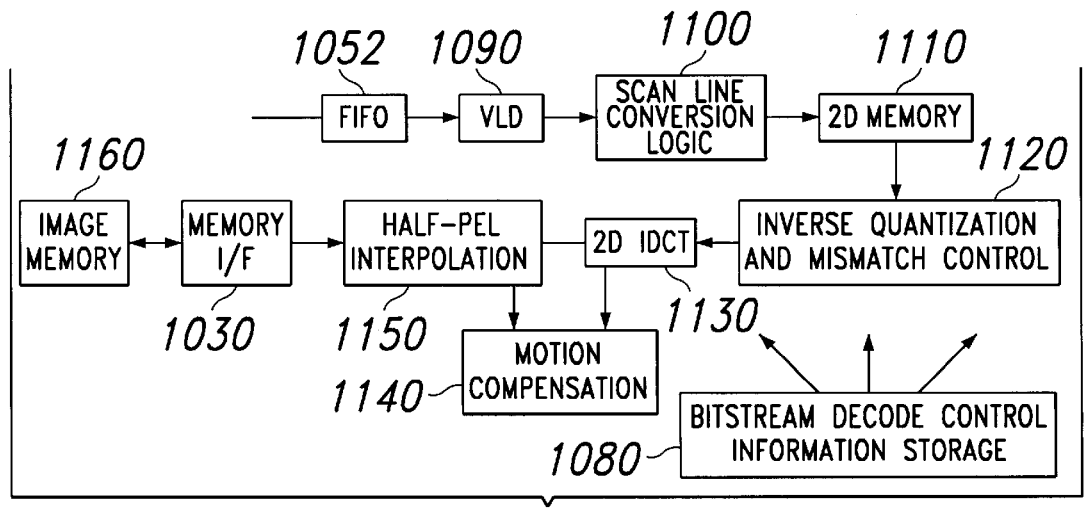
FIG. 4 is a partial block diagram indicating the portion of FIG. 2 needed for a step of a method of the present invention.

Referring now to FIG. 4, there may seen a partial block diagram indicating the portion of FIG. 2 needed for the next step of a method of the present invention which consists of decoding and decompressing the parsed data stream. FIG. 4 also includes additional FIFO 1052, which may different from or the same as FIFO 1050.

Figure 5:
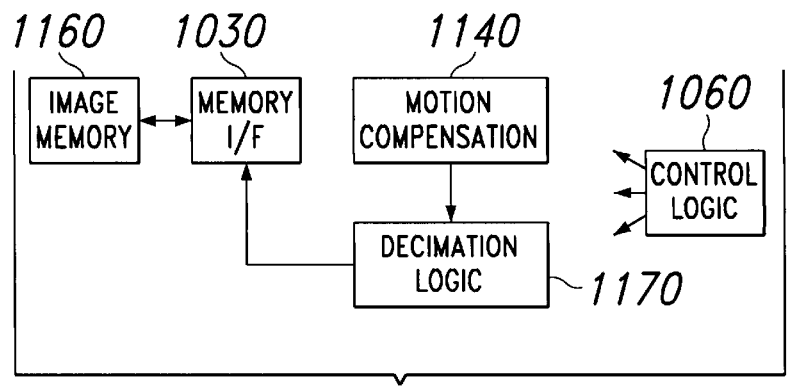
FIG. 5 is a partial block diagram indicating the portion of FIG. 2 needed for a step of a method of the present invention.

Referring now to FIG. 5, there may seen a partial block diagram indicating the portion of FIG. 2 needed for the next step of a method of the present invention which consists of selecting frames for reducing their frame size and then storing the reduced frame size.

Figure 6:
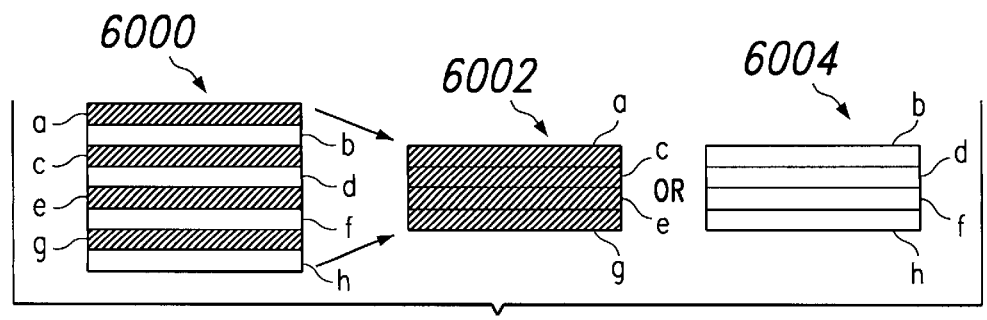
FIG. 6 is a partial block diagram indicating a process for reducing frame size for selected frames.

Referring now to FIG. 6, there may seen a partial block diagram indicating the process 6000 for reducing frame size for selected frames, or decimating selected frames. As may be seen in FIG. 6, there are a plurality of horizontal lines a–h, each containing a plurality of pixels, representative of a frame. In one case alternate lines a,c,e,g are kept and in another case alternate lines b,d,f, h are kept. It may be seen that this reduction in frame size results in cutting the amount of storage for this frame by half.

Figure 7:
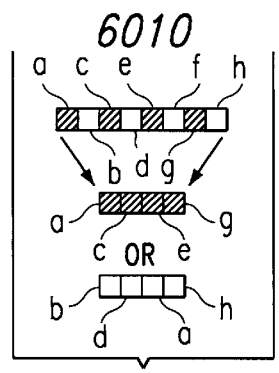
FIG. 7 is a partial block diagram indicating a process for reducing frame size for selected frames.

Referring now to FIG. 7, there may seen a partial block diagram indicating the process for reducing frame size for selected frames, or decimating selected frames. As may be seen in FIG. 7, there are a plurality of pixels a–h, in a horizontal line. In one case alternate pixels a, c, e, g are kept and in another case alternate pixels b, d, f, h are kept. It may be seen that this reduction in frame size results in cutting the amount of storage for this frame by half. However, by employing both line and pixel decimation the amount of storage needed for a frame may be reduced to one fourth that otherwise needed when the method of the present invention is not employed.

Figure 8:
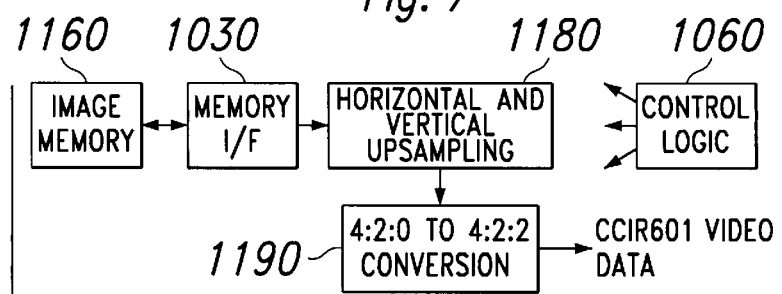
FIG. 8 is a partial block diagram indicating the portion of FIG. 2 needed for a step of a method of the present invention.

Referring now to FIG. 8, there may seen a partial block diagram indicating the portion of FIG. 2 needed for the step of a method of the present invention for restoring the stored reduced frame size for preselected frames back to their normal frame size for display.

Figure 9:
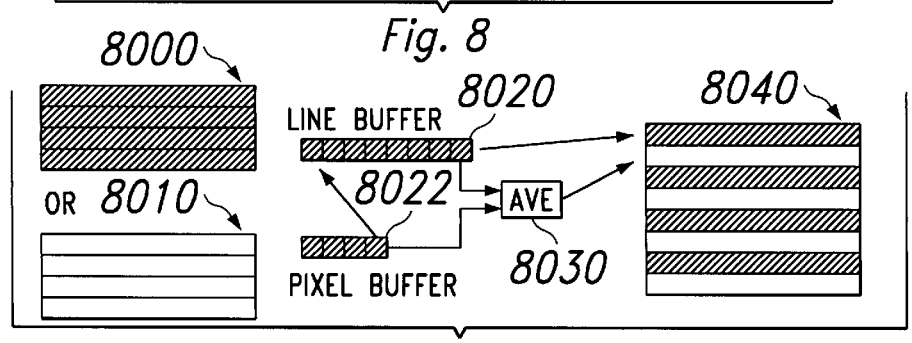
FIG. 9 is a partial block diagram indicating a process for restoring frame size for selected frames.

Referring now to FIG. 9, there may seen a partial block diagram indicating a process for restoring frame size for selected frames. As may be seen in FIG. 9, there are a plurality of horizontal lines each containing a plurality of pixels. In one case 8000 the alternate lines a,c,e,g kept after the decimation of FIG. 6 are expanded and in another case 8010 the alternate lines b,d,f, h kept after the decimation of FIG. 6 are expanded. It may be seen that this restoration in frame size results in returning this frame to its normal size 8040.

FIG. 9 depicts a pixel buffer 8022 and a line buffer 8020, in addition to an averaging circuit 8030. The averaging circuit receives as its inputs the values of two corresponding pixels from two adjacent decimated horizontal lines, such as, for example, but not limited to lines a and c of FIG. 6, and then averages each pair of pixels to derive a corresponding pixel for the missing or decimated horizontal line, such as, for example, but not limited to line b of FIG. 6, that needs to be inserted between the two adjacent decimated horizontal lines before display. In this manner all the pixels down the two adjacent decimated horizontal lines are averaged to generate the pixels for the missing or decimated horizontal line.

Figure 10:
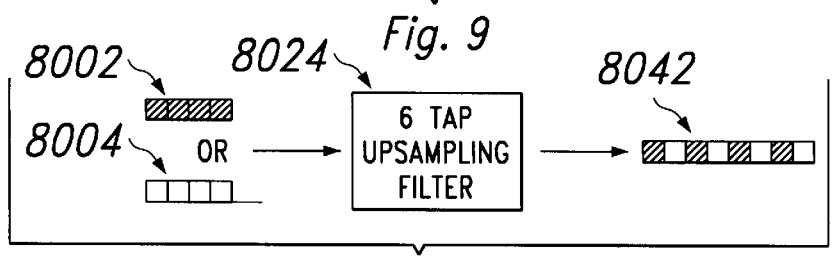
FIG. 10 is a partial block diagram indicating a process for restoring frame size for selected frames.

Referring now to FIG. 10, there may seen a partial block diagram indicating a process for restoring frame size for selected frames. As may be seen in FIG. 10, there are a plurality of pixels in a horizontal line. In one case 8002 alternate pixels a,c,e,g kept after the decimation of FIG. 7 are expanded and in another case 8004 alternate pixels b,d,f, h kept after the decimation of FIG. 7 are expanded. It may be seen that this restoration in frame size results in returning this line to its normal size 8042. A 6 tap upsampling filter 8042 may be defined by the following equation $$X_n=(8*Y_{n-3}+20*Y_{n-2}+100*Y_{n-1}+100*Y_n+20*Y_{n+1}+8*Y_{n+2})/256$$

where $X_n$ is the pixel being reconstructed and $Y_n$ are the available pixels around the location where $X_n$ will be placed. This upsampling filter 8042 may be employed to generate the decimated pixels to restore a horizontal line to its normal length before display. Clearly, other types of upsampling filters may be employed in the present invention.

Thus, it may be seen that the present invention provides a method for video decoding, consisting of, receiving an encoded and compressed data stream, parsing header information from said encoded and compressed data stream, decoding and decompressing the parsed data stream, selectively decimating selected frames to reduce frame size, storing the reduced frame size, and restoring the reduced frame size to normal frame size before display.

However, when both line and pixel decimation have been employed then both restoration processes must be employed to restore the frame to its normal size before display.

As an example of typical memory storage amounts for a decoded and decompressed frame of video data, the following are representative:
NTSC (full frame) 518, 400 bytes
PAL (full frame) 622, 080 bytes
NTSC (half-frame, eg either horizontal or vertical decimation) 259, 200 bytes
PAL (half-frame) 311, 040 bytes
NTSC (quarter-frame, eg both horizontal and vertical decimation) 129, 600 bytes
PAL (quarter-frame) 155, 520 bytes While this invention has been described with reference to illustrative embodiments, this description is not intended to be construed in any limiting sense. Various modifications of the illustrative embodiments, as well as other embodiments of the invention, may be made and will be apparent to persons skilled in the art upon reference to this description. Accordingly, it is contemplated that the appended claims will cover any such modifications or embodiments as fall within the true scope of the present invention.

What is claimed is:

1. A video decoder, comprising:
   an input buffer for receiving an encoded and compressed data stream,
   parsing circuitry for removing video header information from said data stream,
   circuitry for decoding said data stream,
   circuitry for decompressing said data stream into a series of frames,
   circuitry for selecting predetermined portions of preselected frames,
   memory for storing entire frames not preselected and said selected portions of said preselected frames, and
   circuitry for reconstructing the series of frames for display including
       circuitry for recalling said frames not preselected from said memory,
       circuitry for recalling said selected portions of said preselected frames from said memory, and
       circuitry for reconstructing said preselected frames from said selected portions of said preselected frames.

2. A method for reducing the amount of memory for storing video pictures, comprising:
   determining if the amount of video memory needs to be reduced,
   selectively decimating preselected frames of said video picture to reduce their frame size thereby reducing the amount of memory required to store said preselected frames if the amount of video memory needs to be reduced, and
   storing entire frames not preselected and the decimated preselected frames in a memory.

3. The method of claim 2, wherein said determining step, comprises, determining if on screen data is present.

4. An integrated circuit, comprising:
   an input buffer for receiving an encoded and compressed video data stream,
   parsing circuitry for removing video header information from said data stream,
   circuitry for decoding said data stream,
   circuitry for decompressing said data stream into a series of frames,
   circuitry for selecting predetermined portions of preselected frames,
   memory for storing entire frames not preselected and said selected portions of said preselected frames, and
   circuitry for reconstructing the series of frames for display including
       circuitry for recalling said frames not preselected from said memory,
       circuitry for recalling said selected portions of said preselected frames from said memory, and
       circuitry for reconstructing said preselected frames from said selected portions of said preselected frames.

5. A method for video decoding, comprising:
   receiving an encoded and compressed data stream,
   parsing header information from said encoded and compressed data stream, decoding and decompressing the parsed data stream into a series of frames, selectively decimating selected frames to reduce frame size, storing entire nonselected frames and the reduced frame size of said selected frames.

6. The method of claim 5, further comprising, restoring the reduced frame size to normal frame size before display.

7. The video decoder of claim 1, wherein said series of frames includes bidirectionally interpolated frames, and wherein:

said circuitry for selecting portions of preselected frames decimates bidirectionally interpolated frames.

8. The video decoder of claim 1, wherein:

said circuitry for selecting portions of preselected frames selects alternate horizontal lines of said preselected frames, and said circuitry for reconstructing said preselected frames from said selected portions of said preselected frames reconstructs decimated horizontal lines by averaging corresponding pixels of selected horizontal lines.

9. The video decoder of claim 1, wherein:

said circuitry for selecting portions of preselected frames selects alternate pixels of each horizontal line of said preselected frames, and said circuitry for reconstructing said preselected frames from said selected portions of said preselected frames reconstructs decimated pixels by a weighted sum of corresponding selected pixels of said horizontal line.

10. The video decoder of claim 9, wherein:

said circuitry for reconstructing said preselected frames from said selected portions of said preselected frames consists of a 6 tap upsampling filter of the form $$X_n=(8*Y_{n-3}+20*Y_{n-2}+100*Y_{n-1}+100*Y_n+20*Y_{n+1}+8*Y_{n+2})/256$$

where $X_n$ is the pixel being reconstructed and $Y_n$ are respective selected pixels of the same horizontal line near $X_n$.

11. The integrated circuit of claim 4, wherein said series of frames includes bidirectionally interpolated frames, and wherein:

said circuitry for selecting portions of preselected frames decimates bidirectionally interpolated frames.

12. The integrated circuit of claim 4, wherein:

said circuitry for selecting portions of preselected frames selects alternate horizontal lines of said preselected frames, and said circuitry for reconstructing said preselected frames from said selected portions of said preselected frames reconstructs decimated horizontal lines by averaging corresponding pixels of selected horizontal lines.

13. The integrated circuit of claim 4, wherein:

said circuitry for selecting portions of preselected frames selects alternate pixels of each horizontal line of said preselected frames, and said circuitry for reconstructing said preselected frames from said selected portions of said preselected frames reconstructs decimated pixels by a weighted sum of corresponding selected pixels of said horizontal line.

14. The integrated circuit of claim 13, wherein:

said circuitry for reconstructing said preselected frames from said selected portions of said prceselected frames consists of a 6 tap upsampling filter of the form $$X_n=(8*Y_{n-3}+20*Y_{n-2}+100*Y_{n-1}+100*Y_n+20*Y_{n+1}+8*Y_{n+2})/256$$

where $X_n$ is the pixel being reconstructed and $Y_n$ are respective selected pixels of the same horizontal line near $X_n$.

* * * * *